July 24, 1962 H. GUBLER 3,046,067
AXIAL GUIDE FOR THE ROLLS OF ROLLING MILLS
Filed Dec. 22, 1959
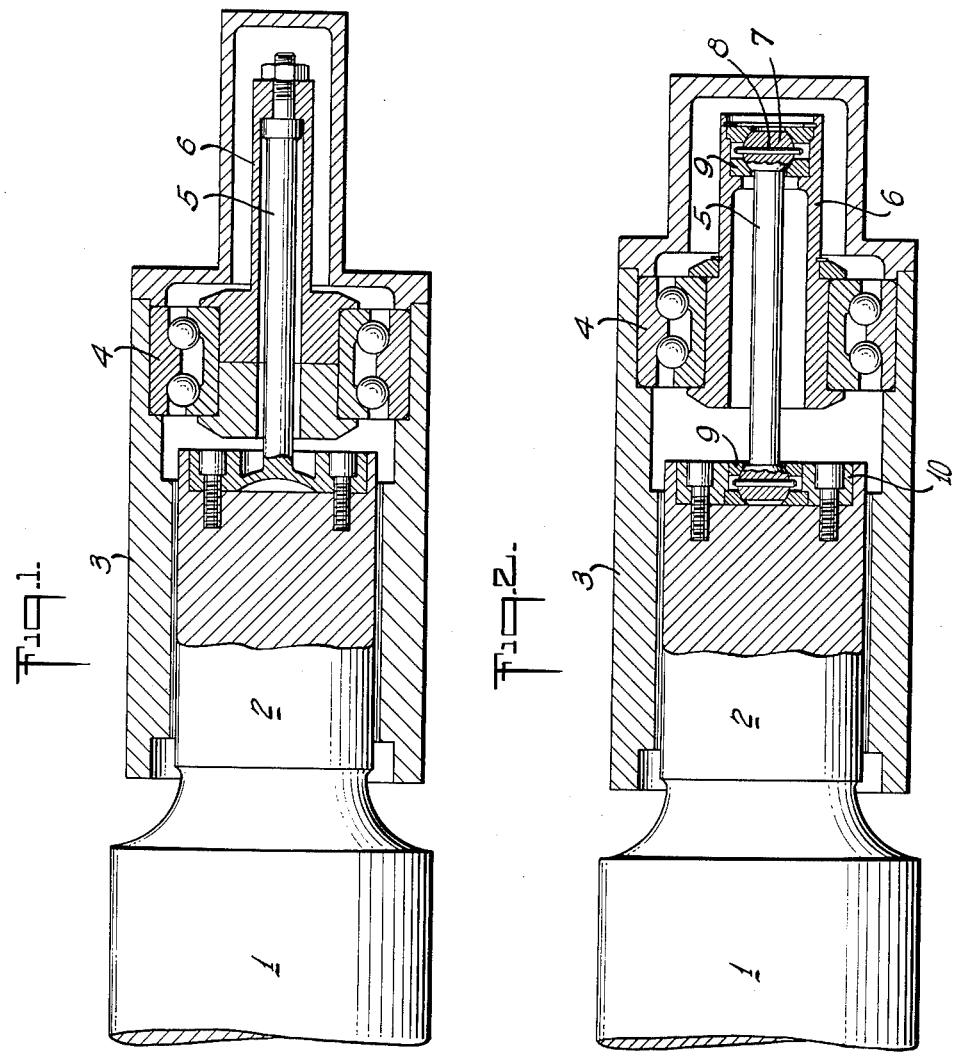
INVENTOR
HULDREICH GUBLER
BY
ATTORNEYS

United States Patent Office 3,046,067
Patented July 24, 1962

3,046,067
AXIAL GUIDE FOR THE ROLLS OF ROLLING MILLS
Huldreich Gubler, Kreuzlingen, Switzerland, assignor to Aluminium - Industrie - Aktien - Gesellschaft, Chippis, Switzerland, a joint-stock company of Switzerland
Filed Dec. 22, 1959, Ser. No. 861,294
Claims priority, application Switzerland Dec. 24, 1958
4 Claims. (Cl. 308—233)

In a rolling stand the rolls rotate with their journals in bearings which take up the radial mechanical stresses. But there are also axial stress-components, which must be taken up by special bearings, the guide bearings, which are disposed in a plane perpendicular to the axis of rotation. Such an axial guide (thrust) bearing is disposed at the end of one of the journals of each roll; the opposite end of each roll, which is the driven end, being mounted in any conventional manner to permit free longitudinal movements of this driven end in response to expansion or contraction of the roll caused by variations of temperature. The known axial bearings of the rolls of rolling mills present however the disadvantage that they are rigidly coupled with the journals of the rolls, so that the roll deflections which are unavoidable in the operation of the rolling mills become transmitted to the guide bearing and cause thereby a great friction and therefore a great temperature rise or a great wear of the guide parts.

The mentioned drawbacks are prevented by my present invention. The said invention relates to an axial guide of the rolls of rolling mills, which guide is characterized by the fact that the connection between the guided roll-journal and the guide bearing is ensured by a radially yielding device which is fastened on one side to the end of the roll pivot and on the other side to the rotating ring of the guide bearing.

Owing to its yieldingness the device according to my invention is appropriate for taking up the eccentric deflections of the roll axis (occurring at the end of the roll journal and caused by the deflections of the roll) without transmitting them to the guide bearing, so that the latter becomes only loaded with proper axial stresses.

The yieldingness of the connecting device can be obtained either through the elasticity of the connecting parts or through an articulated arrangement of the said connecting parts.

The drawing represents schematically two practicable examples of my invention partly in view and partly in longitudinal section. FIG. 1 shows an elastic device and FIG. 2 an articulated device.

The roll 1 rests through its journal 2 on the bearing 3, which is fastened in the rolling stand. In the casing of the bearing 3 there is also fastened the outer ring of the guide bearing 4.

In the arrangement according to FIG. 1 the end of the roll journal 2 is connected with the inner ring of the guide bearing 4 through an elastic device which comprises a rod 5 screwed on the front end of the roll journal 2 and a sleeve-like tube 6 surrounding the rod 5 and fastened at the inner ring of the guide bearing 4. At their free ends there are also connected the rod 5 and the tube 6, so that the axial stresses which have effect on the roll become transmitted through the rod 5 to the tube 6, which on its part transmits stresses to the guide bearing 4.

As well the rod 5 as the tube 6 have such a shape and such a size and dimensions that on the one hand they have a sufficient strength for transmitting the axial stresses and on the other hand a sufficient elasticity for taking up the radial deflections occuring at the end of the roll journal and caused by deflections of the roll.

Although the simplest solution consists in fastening the rod 5 on the front end of the roll journal (as shown in FIG. 1), it is also possible to fasten the said rod on the surface of the journal through a bell-shaped structure attached to the end of the roll journal.

In the example of FIG. 2, the radial deflections are taken up by two ball-and-socket joints 7 disposed at both ends of the connecting rod 5, the rotary motion being transmitted between the roll and the guide bearing through follower pins 8 and through bridges (not shown in the figure) extending between the two halves of each of the two-piece ball boxes 9 which lie respectively within the flange 10 and the sleeve-like tube 6, and engaging the ends of the pins 8 of the balls. One of these ball boxes is fastened with the flange 10 by means of screws at the front end of the roll journal, the other one at the free end of the tube 6. In this example of execution of my present invention, with an articulated connection of the parts of the device, neither the rod 5 nor the tube 6 needs to be elastic.

Any bearing suitable for taking up axial stresses may be used as guide bearing.

The axial guide according to my invention can be used as well with rolls supported in friction bearings as with rolls supported in antifriction bearings.

What I claim is:
1. In or for a rolling mill comprising rolls each of which is provided with a journal and a radial bearing at one end and with a journal at the opposite end and which are arranged to be driven from beyond the journal of at least one of said rollers at said opposite end; a thrust bearing for axial stress components at said one end of each roll beyond said radial bearing and coaxial with said radial bearing, and means yieldable under radial deflections of the journal in said bearing and comprising an axial rod having one end secured to the last-mentioned journal against axial movement with respect thereto and having its other end at a distance therefrom, and a hollow coaxial shaft secured against axial movement to said other end of the rod and extending back over the same, and having with respect to said last-mentioned journal a clearance greater than the greatest possible radial deflection of the journal, said thrust bearing having a portion fixed to said hollow shaft and a portion fixed to said radial bearing, said rod having an elongated portion intermediate its secured ends and unrestricted in a radial direction, the transverse extent of said unrestricted elongated portion being much less than the axial extent of said unrestricted elongated portion.

2. The combination set forth in claim 1 wherein said elongated portion is elastic in a radial direction.

3. The combination set forth in claim 1 wherein said rod is secured to said last-mentioned journal in an articulated manner and to said hollow shaft in an articulated manner.

4. In or for a rolling mill comprising rolls having journals at one end of each thereof, and a radial bearing for each journal; a thrust bearing for axial stress components and coaxial with each radial bearing, and means yieldable under radial deflections of each journal and comprising a coaxial rod haivng one end secured by a ball-and-socket joint to the journal against axial movement with respect thereto and another end beyond the same, and a hollow coaxial shaft secured by a ball-and-socket joint against axial movement to said other end of the rod and extending back over a portion of the same, each of said thrust bearings having portions fixed to a respective hollow shaft and to a respective radial bearing.

References Cited in the file of this patent
UNITED STATES PATENTS

| | | |
|---|---|---|
| 2,530,467 | Hunt | Nov. 21, 1950 |
| 2,738,660 | Gail | Mar. 20, 1956 |

FOREIGN PATENTS

| | | |
|---|---|---|
| 100,667 | Austria | Aug. 10, 1925 |